United States Patent
Whinnery

(10) Patent No.: US 9,168,970 B2
(45) Date of Patent: Oct. 27, 2015

(54) FLYWHEEL ASSEMBLIES AND VEHICLES INCLUDING SAME

(71) Applicant: Honda Motor Co., Ltd., Minato-ku, Tokyo (JP)

(72) Inventor: Joseph P. W. Whinnery, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/197,600

(22) Filed: Mar. 5, 2014

(65) Prior Publication Data
US 2014/0262581 A1    Sep. 18, 2014

Related U.S. Application Data

(60) Provisional application No. 61/786,732, filed on Mar. 15, 2013.

(51) Int. Cl.
*B62K 21/00* (2006.01)
*B62K 21/08* (2006.01)

(52) U.S. Cl.
CPC .................. *B62K 21/00* (2013.01); *B62K 21/08* (2013.01)

(58) Field of Classification Search
CPC ........ B62K 21/00; B62K 21/08; B62K 21/10; B62D 49/08
USPC ......................................... 280/217, 219, 755
See application file for complete search history.

(56) References Cited

U.S. PATENT DOCUMENTS

| | | | |
|---|---|---|---|
| 1,362,024 A | 12/1920 | McKee | |
| 2,247,749 A | 7/1941 | De Venel | |
| 2,472,944 A | 6/1949 | Furer et al. | |
| 2,829,467 A | 4/1958 | Pagano | |
| 3,124,007 A | 3/1964 | Swinney | |

(Continued)

FOREIGN PATENT DOCUMENTS

| EP | 1955936 A1 | 8/2008 |
|---|---|---|
| EP | 1977964 A1 | 10/2008 |

(Continued)

OTHER PUBLICATIONS

U.S. Appl. No. 61/314,540; Titled: Regenerative-Powered Gyroscopic Stabilization Apparatus and Methods; filed Mar. 16, 2010; Inventors: Kim et al; in its entirety.

(Continued)

*Primary Examiner* — Joseph Rocca
*Assistant Examiner* — Felicia L Brittman
(74) *Attorney, Agent, or Firm* — Ulmer & Berne LLP

(57) ABSTRACT

A vehicle includes a frame, an engine, a steering assembly, a steerable wheel, a flywheel assembly, and a controller. The frame has a front end and a rear end and defines a roll axis extending between the front end and the rear end. The engine is supported by the frame. The steering assembly is pivotally coupled with the frame and is pivotable about a steering axis. The steerable wheel is rotatably coupled with the steering assembly. The flywheel assembly comprises an inertial mass and is coupled with the frame. The inertial mass is rotatable about a flywheel axis. The controller is in communication with the flywheel assembly and is configured to facilitate rotation of the inertial mass in one of a counterclockwise direction and a clockwise direction in response to pivoting of the steering assembly in a leftward direction and a rightward direction, respectively. Methods are also provided.

17 Claims, 4 Drawing Sheets

(56) References Cited

U.S. PATENT DOCUMENTS

| | | |
|---|---|---|
| 3,232,635 A | 2/1966 | Drechsel |
| 3,373,832 A | 3/1968 | Summers |
| 3,511,454 A | 5/1970 | Hamilton |
| 3,756,338 A | 9/1973 | Goodridge |
| 3,787,066 A | 1/1974 | Hautier |
| 3,878,913 A | 4/1975 | Lionts et al. |
| 3,881,736 A | 5/1975 | Wilfert |
| 4,200,168 A | 4/1980 | Moog |
| 4,300,168 A | 11/1981 | Kawamura |
| 4,531,605 A | 7/1985 | Scholz et al. |
| 4,545,455 A | 10/1985 | Kanemura et al. |
| 4,625,985 A | 12/1986 | Nakano et al. |
| 4,629,947 A | 12/1986 | Hammerslag et al. |
| 4,691,798 A | 9/1987 | Engelbach |
| 4,712,806 A | 12/1987 | Patrin |
| 4,768,607 A | 9/1988 | Molina |
| 4,779,485 A | 10/1988 | Dollison et al. |
| 4,917,209 A | 4/1990 | Horiike et al. |
| 5,214,358 A | 5/1993 | Marshall |
| 5,568,023 A | 10/1996 | Grayer et al. |
| 5,684,244 A | 11/1997 | Jones |
| 5,820,439 A | 10/1998 | Hair, III |
| 5,823,281 A | 10/1998 | Yamaguchi et al. |
| 5,939,848 A | 8/1999 | Yano et al. |
| 5,960,900 A | 10/1999 | Cheng |
| 6,040,634 A | 3/2000 | Larguier |
| 6,042,449 A | 3/2000 | Ishimoto |
| 6,098,584 A | 8/2000 | Ahner et al. |
| 6,126,185 A | 10/2000 | Kelley et al. |
| 6,360,838 B1 | 3/2002 | Kulhavy |
| 6,369,532 B2 | 4/2002 | Koenen et al. |
| 6,370,475 B1 | 4/2002 | Breed et al. |
| 6,382,338 B1 | 5/2002 | Forbes |
| 6,476,529 B1 | 11/2002 | Tilbor |
| 6,491,121 B2 | 12/2002 | Morimoto et al. |
| 6,710,579 B2 | 3/2004 | Ebel et al. |
| 6,918,467 B2 | 7/2005 | Kasten |
| 7,006,901 B2 | 2/2006 | Wang |
| 7,195,487 B2 | 3/2007 | Robbins |
| 7,211,905 B1 | 5/2007 | McDavid, Jr. |
| 7,296,663 B2 | 11/2007 | Spina |
| 7,314,225 B2 | 1/2008 | Murnen et al. |
| 7,350,787 B2 | 4/2008 | Voss |
| 7,512,466 B2 | 3/2009 | Hart et al. |
| 7,643,933 B2 | 1/2010 | Hirata |
| 7,825,616 B2 | 11/2010 | Clark et al. |
| 8,532,915 B2 | 9/2013 | Kim et al. |
| 8,640,809 B2 | 2/2014 | Whinnery |
| 8,653,681 B2 | 2/2014 | Whinnery |
| 2003/0010554 A1 | 1/2003 | Grong et al. |
| 2003/0146594 A1 | 8/2003 | Bunya et al. |
| 2004/0178009 A1 | 9/2004 | Pavlykivskyj |
| 2005/0045398 A1 | 3/2005 | Suzuki |
| 2006/0244263 A1 | 11/2006 | Manning |
| 2007/0001423 A1 | 1/2007 | Murnen et al. |
| 2007/0163828 A1 | 7/2007 | Manganaro |
| 2008/0228357 A1 | 9/2008 | Hirata |
| 2008/0249684 A1 | 10/2008 | Hirata et al. |
| 2009/0200093 A1 | 8/2009 | Ren |
| 2009/0254251 A1 | 10/2009 | Sato |
| 2011/0163516 A1* | 7/2011 | Whinnery ............... 280/296 |
| 2011/0231041 A1 | 9/2011 | Kim et al. |
| 2011/0231060 A1 | 9/2011 | Kim et al. |
| 2012/0080249 A1* | 4/2012 | Yates et al. ............. 180/65.31 |

FOREIGN PATENT DOCUMENTS

| | | |
|---|---|---|
| WO | 2007086176 A1 | 8/2007 |
| WO | 2011115699 A1 | 9/2011 |

OTHER PUBLICATIONS

Document entitled: CD Dynastore: Overview; Compact Dynamics; Apr. 29, 2008; 28 pages.

Ewan Goodier; Document entitled: "Switched Reluctance Drives"; Centre for Advanced Electronically Controlled Drives; Oct. 17, 2000; 3 pages; University of Leicester, UK, Department of Engineering; retrieved from http://www.le.ac.uk/engineering/research/groups/power/caecd/6p_pedrg.html on Jul. 31, 2009.

Brochure entitled: "HT-RSI High Motor Torque Momentum and Reaction Wheels 14-68 Nms with integrated Wheel Drive Electronics"; 2 pages; Rockwell Collins Deutschland GmbH, Germany; retrieved from www.electronicnote.com/RCG/HT-RSI_A4.pdf on Jan. 27, 2011; Copyright 2007.

\* cited by examiner

FLYWHEEL ASSEMBLIES AND VEHICLES INCLUDING SAME

REFERENCE TO RELATED APPLICATION

This application claims priority of U.S. provisional patent application Ser. No. 61/786,732, filed Mar. 15, 2013, and hereby incorporates this provisional patent application by reference herein in its entirety.

TECHNICAL FIELD

A flywheel assembly is provided on a vehicle. The flywheel assembly can include a rotatable inertial mass configured to selectively exert roll moments upon the vehicle.

BACKGROUND

A vehicle, such as a motorcycle, can include a pivotable steering assembly that rotatably supports a steerable wheel. During operation of the motorcycle, it may be necessary countersteer the pivotable steering assembly to initiate turning of the motorcycle.

SUMMARY

In accordance with one embodiment, a vehicle comprises a frame, an engine, a steering assembly, a steerable wheel, a flywheel assembly, and a controller. The frame has a front end and a rear end and defines a roll axis extending between the front end and the rear end. The engine is supported by the frame. The steering assembly is pivotally coupled with the frame and is pivotable about a steering axis. The steerable wheel is rotatably coupled with the steering assembly. The flywheel assembly comprises an inertial mass and is coupled with the frame. The inertial mass is rotatable about a flywheel axis. The controller is in communication with the flywheel assembly and is configured to facilitate rotation of the inertial mass in one of a counterclockwise direction and a clockwise direction in response to pivoting of the steering assembly in a leftward direction and a rightward direction, respectively.

In accordance with another embodiment, a method for operating a motorcycle is provided. The motorcycle comprises a flywheel assembly having an inertial mass that is rotatable about a flywheel axis. The method comprises detecting pivoting of a steering assembly of the motorcycle in one of a leftward direction and a rightward direction, and rotating the flywheel assembly in one of a counterclockwise direction and a clockwise direction in response to pivoting of the steering assembly in one of a leftward direction and a rightward direction, respectively.

In accordance with yet another embodiment a motorcycle comprises a frame, an engine, a steering assembly, a steerable wheel, a flywheel assembly, a controller, a steering assembly sensor, and a frame. The frame has a front end and a rear end and defines a roll axis extending between the front end and the rear end. The engine is supported by the frame. The steering assembly is pivotally coupled with the frame and is pivotable about a steering axis. The steerable wheel is rotatably coupled with the steering assembly. The flywheel assembly comprises an inertial mass and is coupled with the frame. The inertial mass is rotatable about a flywheel axis. The controller is in communication with the flywheel assembly. The steering assembly sensor is associated with the steering assembly and is in communication with the controller. The steering assembly sensor is configured to detect pivoting of the steering assembly. The controller is configured to facilitate rotation of the inertial mass in one of a counterclockwise direction and a clockwise direction in response to pivoting of the steering assembly in a leftward direction and a rightward direction, respectively. The controller is also configured to inhibit rotation of the flywheel when the steering assembly is provided in a substantially straight-forward position and to control an angular velocity of the flywheel according to a speed of the motorcycle and a position of the steering assembly.

BRIEF DESCRIPTION OF THE DRAWINGS

Various embodiments will become better understood with regard to the following description, appended claims, and accompanying drawings wherein:

DETAILED DESCRIPTION

Figure 1:
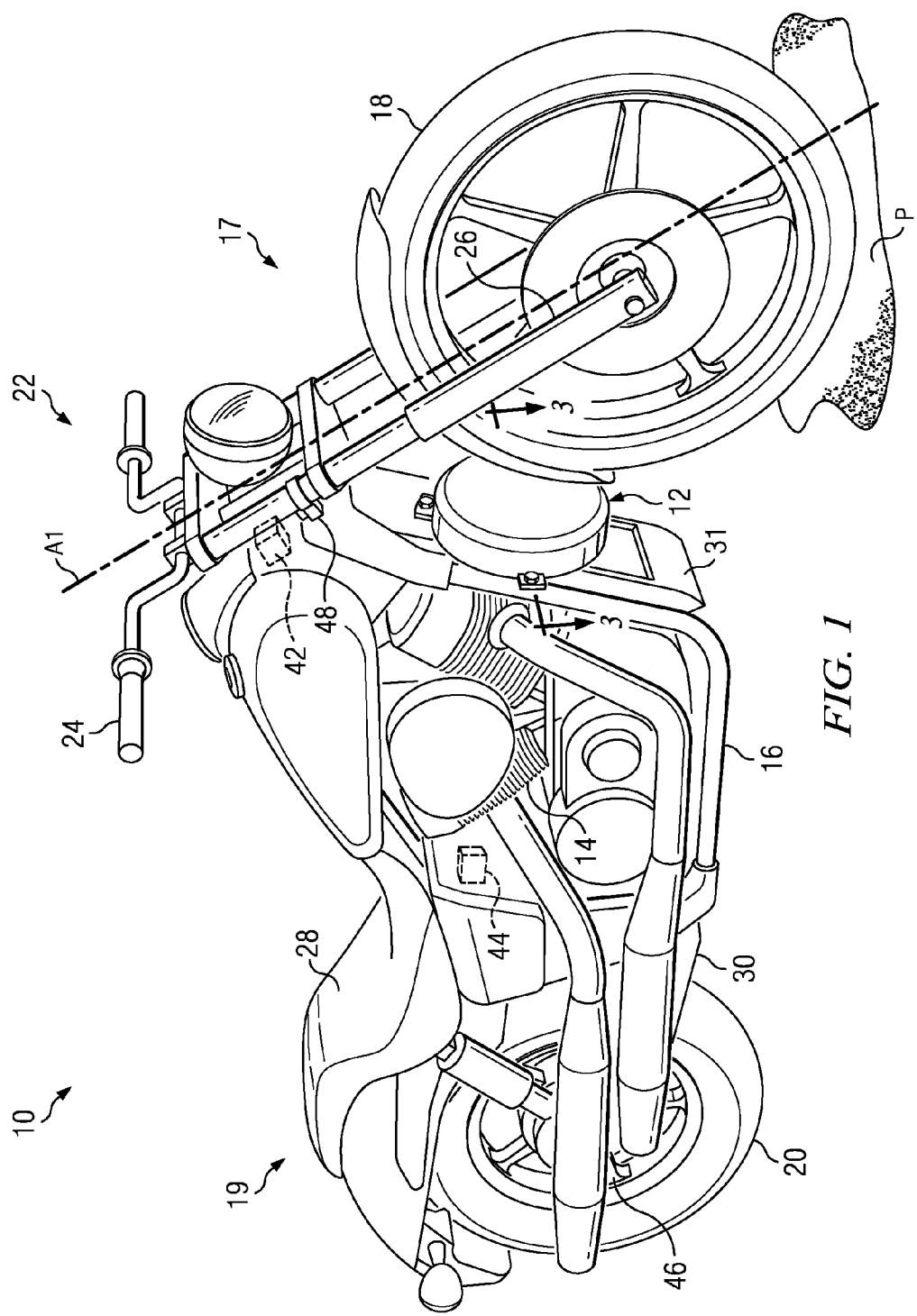
FIG. 1 is a front perspective view of a motorcycle having a steering assembly and a flywheel assembly in accordance with one embodiment.

The present invention and its operation are hereinafter described in detail in connection with the views and examples of FIGS. 1-4, wherein like numbers indicate the same or corresponding elements throughout the views. A motorcycle 10 includes a flywheel assembly 12, as described in further detail below. The flywheel assembly 12 can be provided on any of a variety of other suitable two-wheeled vehicles, such as a scooter, or a bicycle, for example. In one embodiment, as illustrated in FIG. 1, the motorcycle 10 can include an engine 14 that can comprise an internal combustion engine, a turbine-type engine, or any of a variety of other suitable type of engine. The engine 14 can be configured to consume gasoline, diesel fuel, biodiesel, propane, natural gas, ethanol, hydrogen, and/or any of a variety of other suitable fuels or combination thereof. In alternative embodiments, in lieu of an engine or in addition to an engine, a vehicle can include an electric motor or a pair of mechanical foot pedals, for example.

As illustrated in FIG. 1, the motorcycle 10 can include a frame 16, a front wheel 18 and a rear wheel 20. The frame can extend between a front end 17 and a rear end 19. The engine 14 can be coupled with the frame 16 of the motorcycle 10 and can be configured to generate mechanical power for transmission to the front and/or rear wheels 18, 20 of the motorcycle 10. The motorcycle 10 can include a steering assembly 22 having a pair of handlebars 24 coupled with a front fork 26. The front wheel 18 can comprise a steerable wheel that can be rotatably coupled to the front fork 26. The steering assembly 22 can be pivotally coupled with the frame 16 such that the steering assembly 22 is pivotable about a steering axis A1. To steer the motorcycle 10, the steering assembly 22 can be pivoted with respect to the frame 16 through actuation of the handlebars 24 by an operator (not shown) seated upon a seat 28 supported by the frame 16 of the motorcycle 10. The rear wheel 20 can be rotatably supported with respect to the frame 16 by a swing member 30.

In one embodiment as shown generally in FIG. 1, the flywheel assembly 12 can be coupled to the frame 16 between the frame 16 and the front wheel 18. The flywheel assembly 12 can be mounted forwardly of a frame-mounted radiator 31. During operation of the motorcycle 10, ambient air intended to pass across the frame-mounted radiator 31 can facilitate cooling of the flywheel assembly 12. The flywheel assembly 12 can accordingly include heat fins or some other heat-sink arrangement to facilitate more effective cooling of the flywheel assembly 12. It will be appreciated that the flywheel assembly 12 can be positioned at any of a variety of suitable locations upon the motorcycle 10. For example, in an alternative embodiment, a flywheel assembly can be positioned beneath the seat 28. It will be appreciated that the positioning of a flywheel assembly upon a vehicle, such as a motorcycle, can be selected based upon optimization of vehicular space, cost, and weight considerations.

Figure 2:
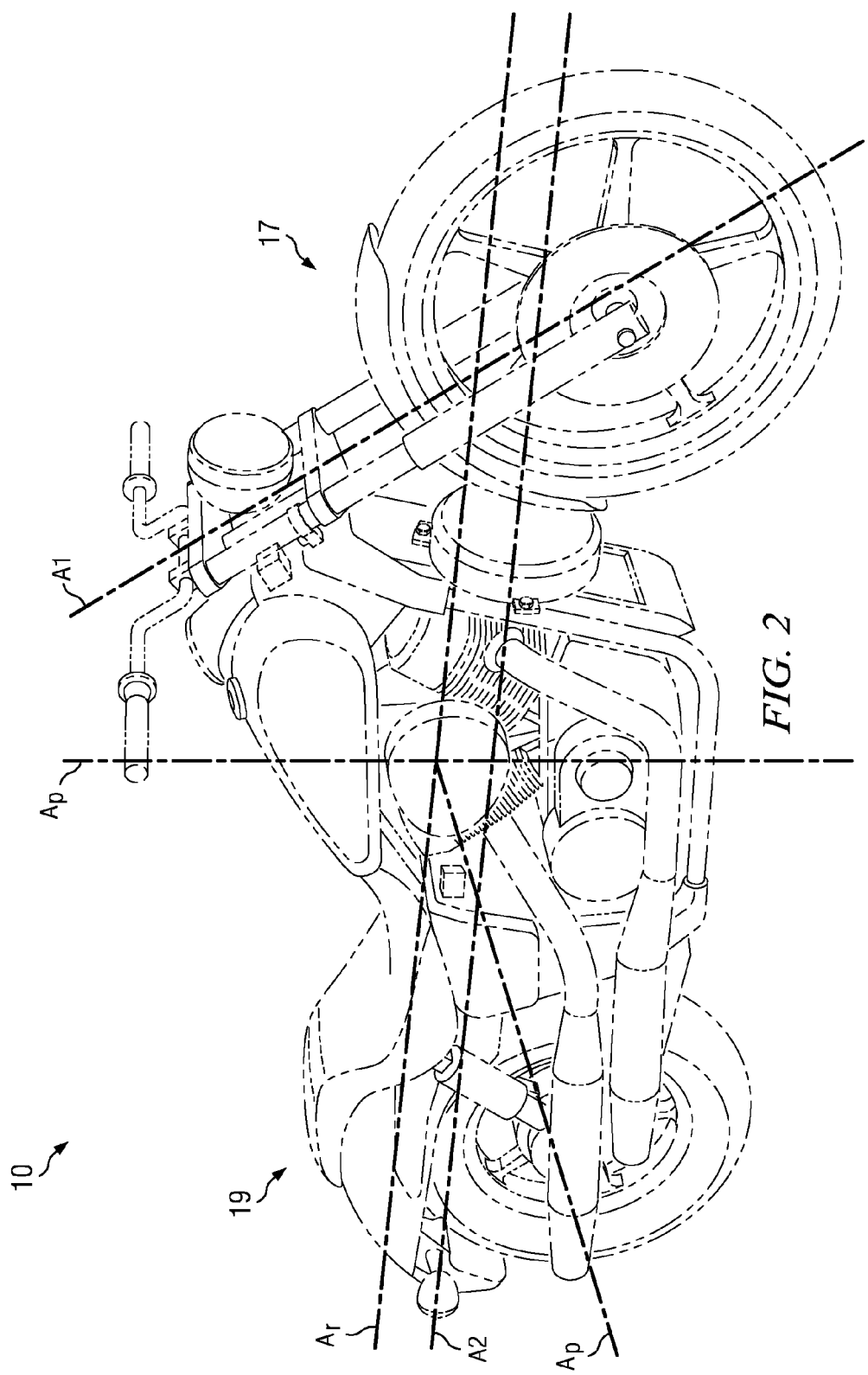
FIG. 2 is a front perspective view of the motorcycle of FIG. 1 depicting various axes of the motorcycle.
Figure 3:
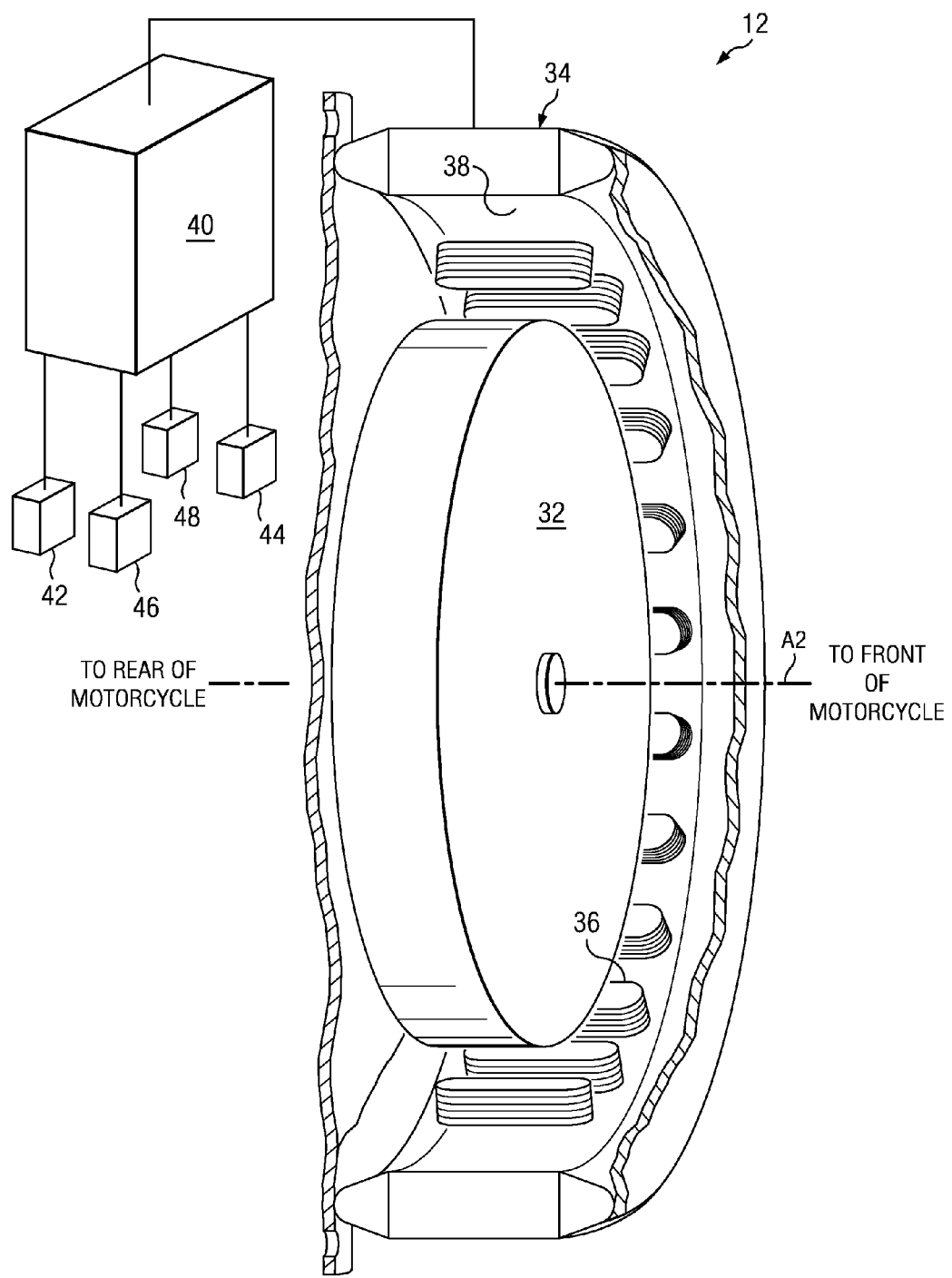
FIG. 3 is a schematic view depicting certain components of the motorcycle of FIG. 1 along with the flywheel assembly of FIG. 1 taken along section line 3-3 in FIG. 1.

As illustrated in FIG. 2, the motorcycle 10 can define a roll axis Ar. As illustrated in FIG. 3, the flywheel assembly 12 can include an inertial mass 32 that is configured to rotate about a spin axis A2. The flywheel assembly 12 can be oriented on the motorcycle 10 such that the spin axis A2 of the inertial mass 32 lies substantially parallel with the roll axis Ar of the motorcycle 10. In one embodiment, the flywheel assembly 12 can be oriented on the motorcycle 10 such that the spin axis A2 of the inertial mass 32 is coaxial with the roll axis Ar of the motorcycle 10. In either of these arrangements, a nutation axis (not shown) of the inertial mass 32 can be substantially coaxial or parallel with a pitch axis Ap (FIG. 2), and a precession axis (not shown) of the inertial mass 32 can be substantially coaxial or parallel with a yaw axis Ay (FIG. 2).

The inertial mass 32 can be configured for selective rotation during operation of the motorcycle 10. In one embodiment, the flywheel assembly 12 can be configured as a flywheel battery (e.g., a flywheel energy storage device) such that the inertial mass 32 is rotated with electrical energy. Typically, a flywheel battery is used to store electrical energy as rotational energy. Therefore, as illustrated in FIG. 3, the inertial mass 32 can be rotatably supported within a containment unit 34 that includes a stator 36. The stator 36 can be disposed along an internal wall 38 of the containment vessel 34 such that it is disposed between the inertial mass 32 and the containment vessel 34. The inertial mass 32 can be configured as a rotor such that the inertial mass 32 can electromagnetically interact with the stator 36 in a manner typical of a conventional brushless DC motor or AC induction motor, or any manner of synchronous electrical machines familiar in the art.

Rotation of the inertial mass 32 can be a function of stored electrical energy. When electrical energy is imparted to the stator 36 to charge the flywheel assembly 12, the angular velocity of the inertial mass 32 can increase. However, when electrical energy is discharged from the flywheel assembly 12 (e.g., an electrical load is coupled to the flywheel assembly 12), the angular velocity of the inertial mass 32 can be decreased.

The containment vessel 34 may be a type of vacuum vessel, for example. The containment vessel 34 can be associated with a vacuum pump (not shown) to facilitate creation of a vacuum within the containment vessel 34. Creation of a sufficient vacuum within the containment vessel 34 can facilitate improved efficiency and reduced friction losses during rotation of the inertial mass 32. The inertial mass 32 can additionally or alternatively be rotatably supported within the containment vessel 34 by bearings (e.g., high efficiency bearings such as mechanical bearings or magnetic bearings) that can further improve efficiency and reduced friction losses during rotation of the inertial mass 32.

As illustrated in FIG. 3, the flywheel assembly 12 can be in communication with a controller 40 that can be configured to control the angular velocity and/or direction of the inertial mass 32. In one embodiment, the controller 40 can include power electronics (e.g., transistors, thyristors, source controlled rectifiers, or insulated gate bipolar transistors) that facilitate control of the direction of rotation of the inertial mass 32. In particular, the power electronics can be configured to selectively apply opposing electrical energy fields within the flywheel assembly 12 to change the direction of the inertial mass 32. It will be appreciated that the power electronics can also be configured to decelerate the inertial mass 32 (e.g., through electronic braking) prior to changing its rotational direction. When the controller 40 initiates a change in the direction of the inertial mass 32, the power electronics can decelerate the inertial mass 32 to rest and can then apply an electrical energy field that rotates the inertial mass 32 in an opposite direction. Deceleration corresponds to a generator mode, whereby mechanical energy is converted to electrical energy. Rotation of the inertial mass 32 can impart a roll moment upon the motorcycle 10 that is proportional with the angular velocity and direction of the inertial mass 32. During operation of the motorcycle 10, this roll moment can affect leaning of the motorcycle 10.

The motorcycle 10 can include a steering assembly sensor 42 and a lean angle sensor 44, as illustrated in FIG. 1. Each of the steering assembly sensor 42 and the lean sensor 44 can be in communication with the controller 40, as illustrated in FIG. 3. The steering assembly sensor 42 can facilitate detection of the steering position of the steering assembly 22. Although the steering assembly sensor 42 is shown to be mounted adjacent to the steering assembly 22, it will be appreciated that a steering assembly sensor can be provided in any of a variety of suitable alternative locations on a motorcycle. In one embodiment, the steering assembly sensor 42 can comprise a rotary encoder, but in other embodiments, the steering assembly sensor 42 can comprise any of a variety of suitable alternative arrangements for detecting a position of the steering assembly 22. The lean angle sensor 44 can facilitate detection of the lean angle of the motorcycle 10 relative to a ground surface, such as when the motorcycle is leaning to navigate a turn. Although the lean angle sensor 44 is shown to be located beneath the seat 28, it will be appreciated that a lean angle sensor 44 can be provided in any of a variety of suitable alternative locations on a motorcycle. In one embodiment, the lean angle sensor 44 can comprise a gyroscope-based pitch sensor, but in other embodiments, the lean angle sensor 44 can comprise any of a variety of suitable alternative arrangements for detecting the lean angle of a motorcycle relative to a ground surface.

The motorcycle 10 can also include a vehicular speed sensor 46 that is in communication with the controller 40, as illustrated in FIGS. 1 and 3. In one embodiment, the vehicular speed sensor 46 can comprise a wheel speed sensor mounted to the rear swing arm 30 adjacent the rear wheel 20. However, a vehicular speed sensor can comprise any of a variety of suitable alternative arrangements for detecting a speed of a motorcycle, such as through use of a global positioning system.

Figure 4:
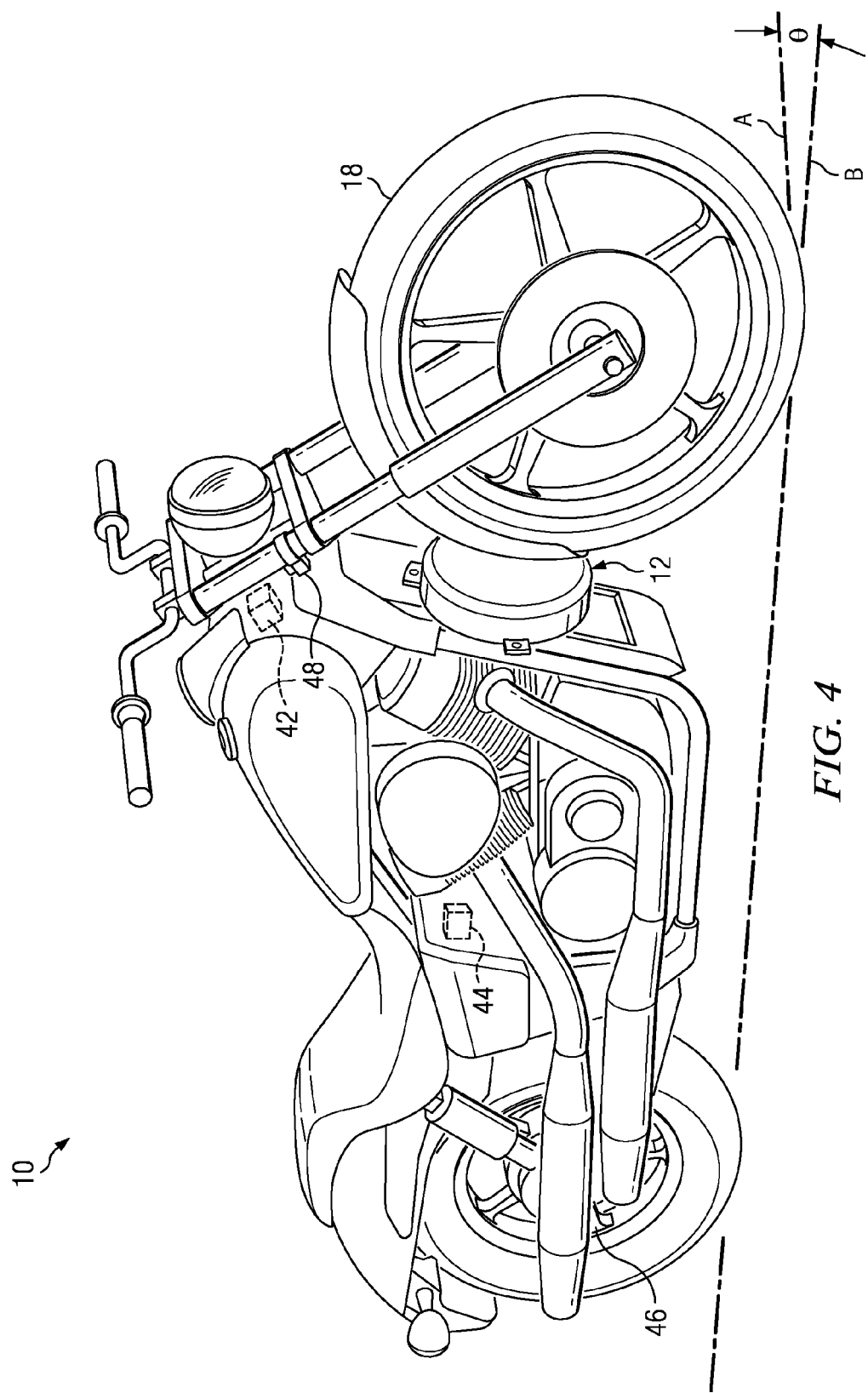
FIG. 4 is a front perspective view of the motorcycle of FIG. 1, but with the steering assembly pivoted into a leftward position.

It will be appreciated that when the motorcycle 10 is operating above a certain speed (e.g., 15 M.P.H), steering the motorcycle 10 through a turn can be achieved by first countersteering the motorcycle 10. For example, to steer the motorcycle 10 into a right turn, the steering assembly 22 can be temporarily pivoted slightly leftwardly, as illustrated in FIG. 4, such that the direction of the front wheel 18 (e.g., centerline A) is angled (e.g., by an angle θ) from a substantially straight forward direction of travel (e.g., centerline B) of the motorcycle 10. This leftward pivoting of the steering assembly 22 can cause the motorcycle 10 to lean rightwardly which can initiate turning of the motorcycle 10 in a rightward direction. Conversely, the motorcycle 10 can be countersteered into a left turn by temporarily pivoting the steering assembly 22 slightly rightwardly to cause the motorcycle 10 to lean leftwardly.

The controller 40 can be configured to operate the flywheel assembly 12 in order to impart a roll moment on the motorcycle 10 that facilitates effective countersteering of the motorcycle 10. For example, when countersteering is initiated for a right turn (e.g., when the steering assembly 22 is pivoted leftwardly, as illustrated in FIG. 4), the controller 40 can cause rotation of the inertial mass 32 of the flywheel assembly 12 in a counterclockwise direction (e.g., as when viewing the flywheel assembly 12 from the front of the motorcycle 10). Counterclockwise rotation of the inertial mass 32 can impart a counterclockwise roll moment on the motorcycle 10 that can accordingly influence the motorcycle 10 into a rightward lean. As illustrated in FIG. 1, a contact patch P between the front wheel 18 and a roadway can be located rearwardly of the point at which the steering axis A1 intersects the roadway. Accordingly, when the motorcycle begins to lean rightwardly, the steering assembly 22 can automatically pivot further leftwardly which can lean the motorcycle 10 further rightwardly. When the motorcycle 10 has completed the rightward turn, (e.g., when the steering assembly 22 begins to be pivoted rightwardly to return the motorcycle 10 into an upright position), the controller 40 can reverse rotation of the inertial mass 32 into a clockwise direction which can impart a clockwise roll moment on the motorcycle 10 that influences the motorcycle 10 into an upward position (e.g., away from the rightward lean). The steering assembly 22 can automatically pivot further rightwardly which can lean the motorcycle 10 further into the upright position.

Conversely, when countersteering is initiated for a left turn (e.g., when the steering assembly 22 is pivoted rightwardly), the controller 40 can rotate the inertial mass 32 of the flywheel assembly 12 in a clockwise direction. Clockwise rotation of the inertial mass 32 can impart a clockwise roll moment on the motorcycle 10 that can influence the motorcycle 10 into a leftward lean. Accordingly, the steering assembly 22 can automatically pivot further rightwardly which causes the motorcycle 10 to lean further leftwardly. When the motorcycle 10 has completed the leftward turn, (e.g., when the steering assembly 22 begins to pivot leftwardly to return the motorcycle 10 into an upright position), the controller 40 can rotate the inertial mass 32 of the flywheel assembly 12 in a counterclockwise direction which can impart a counterclockwise roll moment on the motorcycle 10 that influences the motorcycle 10 into an upward position (e.g., away from the leftward lean). The steering assembly 22 can automatically pivot further leftwardly which can lean the motorcycle 10 further into the upright position. Operation of the flywheel assembly 12 in this manner can accordingly result in improved steering performance of the motorcycle 10 and improved steering response for an operator which can facilitate more effective operation of the motorcycle 10 through a turn. It will be appreciated that the flywheel assembly 12 can effectively provide electronic power steering assist for the motorcycle 10.

It will be appreciated that the controller 40 can tailor the angular velocity of the inertial mass 32 to exert a roll moment that is appropriate for effective leaning of the motorcycle 10 and pivoting of the steering assembly 22 during countersteering. In one embodiment, the controller 40 can vary the angular velocity of the inertial mass 32 according to the speed of the motorcycle 10 and the severity of a turn. For example, the controller 40 can rotate the inertial mass 32 more slowly when the motorcycle 10 is navigating a gradual turn at a slow speed than when the motorcycle 10 is navigating a sharp turn at faster speeds. In one embodiment, the controller 40 can determine the severity of a turn according to the lean angle sensor 44. In another embodiment, the path of turns for the motorcycle 10 can be predetermined such as when the motorcycle 10 is operated on a racetrack. In such an embodiment, the controller 40 can be loaded with predefined control directives for the inertial mass 32 that correspond to the path of the turns for motorcycle 10. In another embodiment, the path of turns for the motorcycle 10 can be unspecified. In such an embodiment, the controller 40 can be configured to predict the path of turns for the motorcycle 10 such as with a global position system or other suitable predictive means. It will be appreciated that the controller 40 can additionally or alternatively determine the severity of a turn with any of a variety of suitable methods.

It will also be appreciated that the controller 40 can be configured to inhibit rotation of the inertial mass 32 when certain operating conditions might not permit effective countersteering of the motorcycle 10. For example, pivoting of the steering assembly 22 during operation of the motorcycle 10 below a threshold speed (e.g., 15 M.P.H.) will typically turn the motorcycle 10 in the direction of the steering assembly 22 (e.g., no countersteer). Therefore, the controller 40 can be configured to inhibit rotation of the inertial mass 32 during operation of the motorcycle 10 below the threshold speed. In another example, during navigation of a turn, excessive pivoting of the steering assembly 22 or excessive leaning of the motorcycle 10 can result in the motorcycle 10 becoming unstable and possibly overturning. The controller 40 can therefore be configured to inhibit rotation of the inertial mass 32 during excessive pivoting of the steering assembly 22 (e.g., as detected by the steering assembly sensor 42 and transmitted to the controller 40) or excessive leaning of the motorcycle 10 (e.g., as detected by the lean angle sensor 44 and transmitted to the controller 40). In yet another example, the controller 40 can be configured to inhibit rotation of the inertial mass 32 when the motorcycle 10 is travelling in a substantially straight-forward direction (e.g., along centerline B illustrated in FIG. 4).

In one embodiment, the flywheel assembly 12 can be powered from the motorcycle's electrical system. During operation of the flywheel assembly 12, an onboard battery of the motorcycle 10 can be charged and discharged in order to vary the rotation of the inertial mass 32. Such operation of the flywheel assembly 12 using the motorcycle's onboard battery can overburden the onboard battery which can reduce the useful life of the onboard battery and can affect the overall performance of the motorcycle's electrical system. Thus, in an alternative embodiment, the flywheel assembly 12 can be coupled with a dedicated energy storage device (not shown). The dedicated energy storage device can be configured to exchange electrical energy with the flywheel assembly 12. For example, to increase the angular velocity of the inertial mass 32, electrical energy can be discharged from the dedicated energy storage device and provided to the flywheel assembly 12. To decrease the angular velocity of the inertial mass 32, electrical energy can be discharged from the flywheel assembly 12 and provided to charge the dedicated energy storage device. It will be appreciated that transferring energy between the flywheel assembly 12 and the dedicated energy storage device can reduce the electrical burden placed on the motorcycle's electrical system, thereby improving the longevity of the onboard battery and the overall performance of the motorcycle's electrical system.

It will be appreciated that the dedicated energy storage device can comprise any of a variety of suitable power sources such as, for example, a battery, a capacitor, a fuel cell, a hydraulic or pneumatic pressure source, or another mechanical energy storage device. The type of energy storage device can be selected based upon size, weight, energy storage capacity, efficiency, and other factors. In one embodiment, the dedicated energy storage device can include a flywheel battery. In such an embodiment, the positioning of the dedicated energy storage device upon a vehicle, such as a motorcycle, can be selected such that its gyroscopic effects do not adversely affect, or perhaps even positively affect, handling and other performance characteristics of the vehicle.

It will be appreciated that multiple rotatable inertial masses similar to rotatable inertial mass 32 can be implemented co-axially to provide redundancy of operation. When multiple rotating inertial masses act on a system, the sum of all of the individual roll moments produce a resultant roll moment on the entire system. Therefore, when multiple rotating masses of appreciable inertia are included in an embodiment, the controller can be configured to operate on each mass to produce the desired resultant moments.

In one embodiment, as illustrated in FIG. 1, the motorcycle 10 can include an electronic steering damper 48. The electronic steering damper 48 can be in communication with the controller 40, as illustrated in FIG. 3. The electronic steering damper 48 can be coupled with the steering assembly 22 and the frame 16 of the motorcycle 10. The electronic steering damper 48 can be configured to restrict steering of the steering assembly 22 when operating conditions of the motorcycle 10 are not suitable for rapid turning of the motorcycle 10. The controller 40 can operate the electronic steering damper 48 in conjunction with the flywheel assembly 12. If the flywheel assembly 12 is operated during countersteering of the motorcycle 10, the controller 40 can actuate the electronic steering damper 48 to resist pivoting of the steering assembly 22. U.S. Patent Application Publication No. 2009/0198411 A1 is hereby incorporated herein by reference in its entirety, and discloses an electronic steering damper system for a vehicle.

Since the flywheel assembly 12 can be configured as a flywheel battery, as described above, it will be appreciated that in some embodiments the flywheel assembly 12 can be configured to provide supplemental electrical energy storage for the motorcycle 10. For example, in one embodiment, the flywheel assembly 12 can be a backup energy storage source for the motorcycle's onboard battery. In such an embodiment, the flywheel assembly 12 can be fully charged (e.g., from the onboard battery) prior to shutting down the motorcycle 10. If the onboard battery is discharged during shutdown (e.g., by leaving a headlamp on), the flywheel assembly 12 can provide the electrical energy necessary to start the motorcycle 10 in lieu of the onboard battery.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A vehicle comprising:
a frame having a front end and a rear end and defining a roll axis extending between the front end and the rear end;
an engine supported by the frame;
a steering assembly pivotally coupled with the frame and pivotable about a steering axis;
a steerable wheel rotatably coupled with the steering assembly;
a flywheel assembly comprising an inertial mass and being coupled with the frame, the inertial mass being rotatable about a flywheel axis; and
a controller coupled with the flywheel assembly and configured to facilitate rotation of the inertial mass in one of a counterclockwise direction and a clockwise direction in response to pivoting of the steering assembly in a leftward direction and a rightward direction, respectively, wherein the controller is configured to inhibit rotation of the inertial mass during operation of the vehicle below a threshold speed.

2. The vehicle of claim 1 comprising a steering assembly sensor associated with the steering assembly and in communication with the controller to facilitate detection of pivoting of the steering assembly in the leftward direction and the rightward direction.

3. The vehicle of claim 1 wherein the controller is configured to inhibit rotation of the inertial mass when the steering assembly is in a substantially straight-forward position.

4. The vehicle of claim 1 wherein the controller is configured to control an angular velocity of the inertial mass according to pivoting of the steering assembly and a speed of the vehicle.

5. The vehicle of claim 1 wherein the threshold speed is about 15 M.P.H.

6. The vehicle of claim 1 wherein the flywheel axis is substantially parallel with the roll axis.

7. The vehicle of claim 6 wherein the flywheel axis is not coaxial with the roll axis.

8. The vehicle of claim 1 further comprising a steering damper coupled with the frame and the steering assembly, the steering damper being configured to selectively dampen pivoting of the steering assembly.

9. The vehicle of claim 8 wherein the steering damper comprises an electronic steering damper in communication with the controller and wherein the controller is configured to operate the steering damper in conjunction with rotation of the inertial mass.

10. The vehicle of claim 1 further comprising a radiator coupled with the frame, wherein the flywheel assembly is disposed between the radiator and the steering assembly.

11. The vehicle of claim 1 comprising a motorcycle.

12. A method for operating a motorcycle, the motorcycle comprising a flywheel assembly having an inertial mass that is rotatable about a flywheel axis, the method comprising:
detecting pivoting of a steering assembly of the motorcycle in one of a leftward direction and a rightward direction;
rotating the flywheel assembly in one of a counterclockwise direction and a clockwise direction in response to pivoting of the steering assembly in one of a leftward direction and a rightward direction, respectively; and
inhibiting rotation of the inertial mass during operation of the motorcycle below a threshold speed.

13. The method of claim 12 further comprising inhibiting rotation of the inertial mass when the steering assembly is in a substantially straight-forward position.

14. The method of claim 12 further comprising controlling an angular velocity of the inertial mass in response to pivoting of the steering assembly and a speed of the motorcycle.

15. The method of claim 12 further comprising operating an electronic steering damper in conjunction with the inertial mass.

16. A motorcycle comprising:
- a frame having a front end and a rear end and defining a roll axis extending between the front end and the rear end;
- an engine supported by the frame;
- a steering assembly pivotally coupled with the frame and pivotable about a steering axis;
- a steerable wheel rotatably coupled with the steering assembly;
- a flywheel assembly comprising an inertial mass and being coupled with the frame, the inertial mass being rotatable about a flywheel axis;
- a controller in communication with the flywheel assembly; and
- a steering assembly sensor associated with the steering assembly and in communication with the controller, the steering assembly sensor configured to detect pivoting of the steering assembly;

wherein the controller is configured:
- facilitate rotation of the inertial mass in one of a counterclockwise direction and a clockwise direction in response to pivoting of the steering assembly in a leftward direction and a rightward direction, respectively;
- inhibit rotation of the inertial mass when the steering assembly is provided in a substantially straight-forward position;
- control an angular velocity of the inertial mass according to a speed of the motorcycle and a position of the steering assembly; and
- inhibit rotation of the inertial mass during operation of the motorcycle below a threshold speed.

17. The motorcycle of claim 16 further comprising an electronic steering damper coupled with the frame and the steering assembly and configured to selectively dampen pivoting of the steering assembly.

* * * * *

UNITED STATES PATENT AND TRADEMARK OFFICE
CERTIFICATE OF CORRECTION

| | | |
|---|---|---|
| PATENT NO. | : 9,168,970 B2 | Page 1 of 1 |
| APPLICATION NO. | : 14/197600 | |
| DATED | : October 27, 2015 | |
| INVENTOR(S) | : Joseph P. W. Whinnery | |

It is certified that error appears in the above-identified patent and that said Letters Patent is hereby corrected as shown below:

In The Claims

Claim 16, column 10, line 1, change "configured" to --configured to--.

Signed and Sealed this
Twenty-third Day of February, 2016

Michelle K. Lee
*Director of the United States Patent and Trademark Office*